(12) United States Patent
Bickel et al.

(10) Patent No.: US 9,139,223 B2
(45) Date of Patent: Sep. 22, 2015

(54) MANAGING STEERING WITH SHORT FROM BATTERY TO GROUND

(71) Applicant: Caterpillar Inc., Peoria, IL (US)

(72) Inventors: Thomas J. Bickel, Lacon, IL (US); Amanda J. Wilke, Peoria, IL (US); Wendell D. Stahl, Bradford, IL (US); Andrew G. Genseal, Chillicothe, IL (US); Md Nasir Uddin, Peoria, IL (US); Dane S. Richards, Toulon, IL (US); Jennie L. Nelson, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 18 days.

(21) Appl. No.: 13/901,238

(22) Filed: May 23, 2013

(65) Prior Publication Data

US 2014/0350794 A1    Nov. 27, 2014

(51) Int. Cl.
*B62D 6/00* (2006.01)
*H02H 3/16* (2006.01)
*B62D 5/04* (2006.01)

(52) U.S. Cl.
CPC .. *B62D 6/00* (2013.01); *B62D 5/04* (2013.01); *B62D 5/0481* (2013.01); *H02H 3/16* (2013.01)

(58) Field of Classification Search
CPC .............................. B62D 5/0457; B62D 5/0463
USPC .......... 701/41, 301, 42, 70; 318/139, 432, 438
See application file for complete search history.

(56) References Cited

U.S. PATENT DOCUMENTS

| | | | |
|---|---|---|---|
| 4,624,335 A | 11/1986 | Shiraishi et al. | |
| 6,208,923 B1 | 3/2001 | Hommel et al. | |
| 6,381,528 B1 * | 4/2002 | Kawada et al. | 701/41 |
| 6,539,298 B2 * | 3/2003 | Inagaki et al. | 701/70 |
| 6,548,969 B2 | 4/2003 | Ewbank et al. | |
| 6,612,393 B2 | 9/2003 | Bohner et al. | |
| 6,693,405 B2 | 2/2004 | Blanke et al. | |
| 6,727,669 B2 * | 4/2004 | Suzuki et al. | 318/139 |
| 7,222,008 B2 | 5/2007 | Takahashi et al. | |
| 7,272,479 B2 * | 9/2007 | Kifuku | 701/41 |
| 7,289,889 B2 * | 10/2007 | Naik et al. | 701/1 |
| 7,427,843 B2 * | 9/2008 | Kifuku | 318/432 |
| 7,433,767 B2 | 10/2008 | Takeuchi et al. | |
| 7,726,436 B2 | 6/2010 | Pfeiffer et al. | |
| 7,822,516 B2 | 10/2010 | Yanaka et al. | |

(Continued)

FOREIGN PATENT DOCUMENTS

| | | |
|---|---|---|
| DE | 102006062300 | 10/2008 |
| EP | 2583879 | 4/2013 |

*Primary Examiner* — Thomas G Black
*Assistant Examiner* — Wae Louie
(74) *Attorney, Agent, or Firm* — Miller, Matthias & Hull LLP

(57) ABSTRACT

A redundancy system for a steering system having a primary controller and a primary power source is provided. The redundancy system may include a secondary controller coupled to a secondary power source and configured to manage control of the steering system, and an interface circuit disposed between at least a first node and a second node. The first node may be in electrical communication with the primary power source, and the second node may be in electrical communication with the secondary power source. The interface circuit may be configured to selectively engage a self-test of the primary power source and the secondary power source, isolate a short at the first node from the secondary power source, and isolate a short at the second node from the primary power source.

20 Claims, 5 Drawing Sheets

(56) References Cited

U.S. PATENT DOCUMENTS

| | | | |
|---|---|---|---|
| 7,957,866 B2* | 6/2011 | Oba et al. | 701/41 |
| 8,240,425 B2 | 8/2012 | Nagase | |
| 8,280,623 B2* | 10/2012 | Trepagnier et al. | 701/301 |
| 2002/0022914 A1* | 2/2002 | Kawada et al. | 701/41 |
| 2002/0147532 A1* | 10/2002 | Inagaki et al. | 701/41 |
| 2003/0071587 A1* | 4/2003 | Suzuki et al. | 318/139 |
| 2005/0228546 A1* | 10/2005 | Naik et al. | 701/1 |
| 2007/0152614 A1* | 7/2007 | Kifuku | 318/432 |
| 2007/0215405 A1* | 9/2007 | Tsutsumi et al. | 180/402 |
| 2008/0091319 A1 | 4/2008 | Schick et al. | |
| 2008/0097666 A1* | 4/2008 | Oba et al. | 701/41 |
| 2008/0249685 A1* | 10/2008 | Hara et al. | 701/42 |
| 2012/0006603 A1 | 1/2012 | Thomson et al. | |
| 2012/0085458 A1* | 4/2012 | Wenzel | 141/10 |
| 2012/0293316 A1* | 11/2012 | Johnson et al. | 340/438 |
| 2014/0188338 A1* | 7/2014 | Ito et al. | 701/41 |
| 2014/0222292 A1* | 8/2014 | Fisher et al. | 701/41 |

\* cited by examiner

MANAGING STEERING WITH SHORT FROM BATTERY TO GROUND

TECHNICAL FIELD

The present disclosure generally relates to steering systems, and more particularly, to systems and methods for providing redundant control of a steering system.

BACKGROUND

Steering systems are commonly used in a variety of different fields to provide an operator with directional control of a vehicle, machine, or the like. With ongoing developments in technology, increasingly more steering systems are being implemented with electrical means, such as electro-hydraulic or steer-by-wire steering systems, which convert operator input into mechanical or directional changes in the vehicle or machine. However, as these systems rely on a continuous supply of electrical energy, such as batteries, generators, or the like, any significant interruption to the power source may limit or completely disable the operator's ability to control or steer the vehicle or machine.

One known electrical failure occurs when there is a short circuit in the primary power source. In systems relying on batteries, for example, a cable connected to a positive terminal of the batteries may short-circuit or come into contact to ground or a ground-wire. Such shorting of the primary power source can disable power to all electrical components connected thereto, including the associated electronic controller, or the electronic control module (ECM) that is, among other things, responsible for managing operation of the steering system. Without an operating ECM and without a fully functioning steering system, the operator may be unable to steer the vehicle or machine into more convenient or safer positions until the failure is repaired.

A solution to the shorting problem implements shielded battery cables configured to provide early indications of wear potentially leading to short-circuit conditions. Shielded battery cables provide the battery cables with an extra insulating layer of protection, as well as conductivity therethrough which varies in response to any significant wear in the cable shielding. When the cable or cable shielding is worn or if there is a potential short-circuit condition, the shielded battery cables may be configured such that corresponding changes in the conductivity thereof trigger visual and/or audible indicators designed to warn the operator of such conditions.

While systems employing shielded battery cables provide some level of protection and forewarning, such systems are still unable to reliably provide warnings sufficiently prior to hard short-circuit conditions and/or conditions in which the cable is completely or partially cut into. The aforenoted safeguards also lack an automated self-test or any other comparable means for ensuring proper functionality of the steering system as well as any redundant or protective measures therefor upon machine startup. In addition, there is a need for reduced costs of implementation. The present disclosure is directed at addressing one or more of the needs set forth above.

SUMMARY OF THE DISCLOSURE

In one aspect of the present disclosure, a method of providing redundant control of a steering system using one of a first controller and a second controller is provided. The method may provide an interface circuit between at least a first node and a second node of the steering system, where the first node may be electrically disposed between a primary power source and the first controller, and the second node may be electrically disposed between a secondary power source and the second controller. The method may further automatically engage a self-test of the primary power source and the secondary power source upon machine startup, engage the interface circuit to isolate the short from the secondary power source and engage the second controller to operate the steering system in response to a short at the first node, and engage the interface circuit to isolate the short from the primary power source and enable the first controller to operate the steering system in response to a short at the second node.

In another aspect of the disclosure, a redundancy system for a steering system having a primary controller and a primary power source is provided. The redundancy system may include a secondary controller coupled to a secondary power source and configured to manage control of the steering system, and an interface circuit disposed between at least a first node and a second node. The first node may be in electrical communication with the primary power source, and the second node may be in electrical communication with the secondary power source. The interface circuit may be configured to selectively engage a self-test of the primary power source and the secondary power source, isolate a short at the first node from the secondary power source, and isolate a short at the second node from the primary power source.

In yet another aspect of the disclosure, a control system is provided. The control system may include a primary power source in communication with a common bus associated with the control system, a secondary power source in selective communication with the common bus, a first controller in communication with a first node of the common bus configured to manage control of a steering system, a second controller in communication with a second node of the common bus configured to manage control of the steering system, and an interface circuit disposed between the first node and the second node. The interface circuit may include a blocking device configured to isolate a short at the first node from the secondary power source, a fusible link configured to isolate a short at the second node from the primary power source, and a self-test element configured to selectively engage a self-test of the primary power source and the secondary power source.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
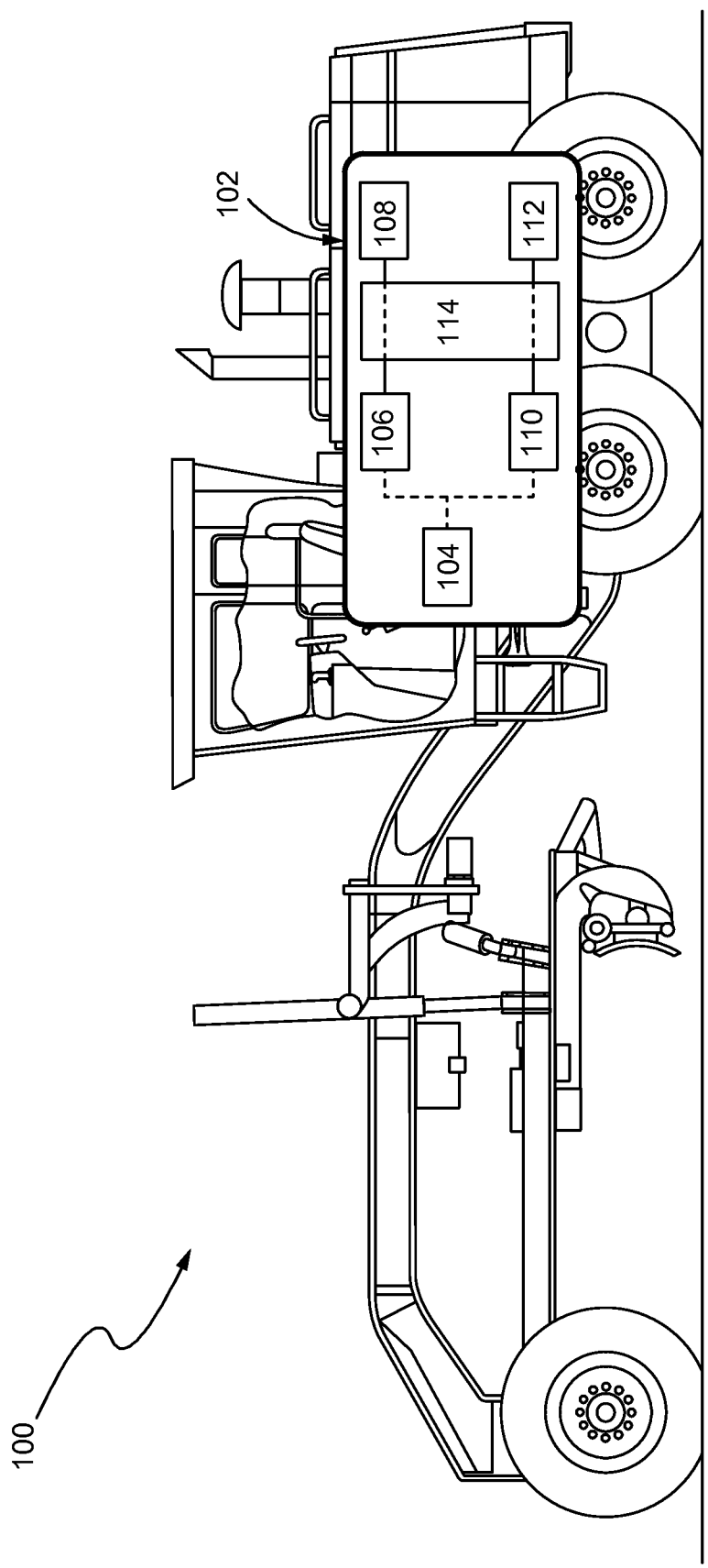
FIG. 1 is a diagrammatic view of one machine employing a steering system that is controlled by a redundant control system constructed in accordance with the teachings of the present disclosure.

With reference to FIG. 1, one exemplary embodiment of a machine 100, for example, in the form of a motor grader is illustrated. It will be appreciated that, although illustrated as a motor grader, the machine 100 may alternatively include any machine or vehicle that is steerable and performs some type of operation associated with an industry such as mining, construction, farming, transportation, or any other industry known in the art. For example, the machine 100 may be a wheel loader, a tractor, a transport vehicle, such as truck, or the like. As can be appreciated, the representations of the various mechanisms presented herein are generic and are meant to encompass all possible mechanisms or devices used to convey an operator's commands to a machine, including, for example, joystick operation.

As shown, the machine 100 may generally include a control system 102 for a steering mechanism or steering system 104 associated with the machine 100. The steering system 104 may manage operation of the steering capabilities of the machine 100 based on and according to input provided by an operator of the machine 100. Steering input may be provided, for example, using one or more joysticks, one or more steering wheels, or any other suitable means enabling an operator to steer and/or operate the machine 100. The steering system 104 may alternatively or additionally steer and operate the machine 100 in response to steering input provided remotely or off-site through electronic interfaces, controllers, and the like. Moreover, the steering system 104 may implement fully or at least partially electrical mechanisms for steering the machine 100, such as electro-hydraulic or steer-by-wire steering systems, which convert mechanical and/or electrical operator input into mechanical or directional changes in the machine 100.

Still referring to FIG. 1, the control system 102 may further provide redundancy to the steering system 104 using, for example, a first controller 106, a primary power source 108, a second controller 110, a secondary power source 112, an interface circuit 114, among others. In general, the first and second controllers 106, 110 may ordinarily be powered by an alternator of the machine 100, and during fault conditions, the first and second controllers 106, 110 may be selectively powered by one of the primary and secondary power sources 108, 112 of the control system 102. Each of the first and second controllers 106, 110 may be configured to independently operate according to one or more predetermined algorithms which, among other things, enable any one of the controllers 106, 110 to at least temporarily manage control of the associated steering system 104. For example, each of the first and second controllers 106, 110 may be implemented using one or more of a processor, a microprocessor, a microcontroller, an electronic control module (ECM), a digital signal processor (DSP), a field-programmable gate array (FPGA), an electronic control unit (ECU), or any other suitable means for managing operation of the steering system 104 associated with the machine 100. Furthermore, each of the primary power source 108 and the secondary power source 112 of FIG. 1 may employ any one or more of a variety of known power sources or energy storage devices, such as batteries, capable of selectively supplying direct current (DC) power to a corresponding one of the first controller 106 and the second controller 110 as needed.

Figure 2:
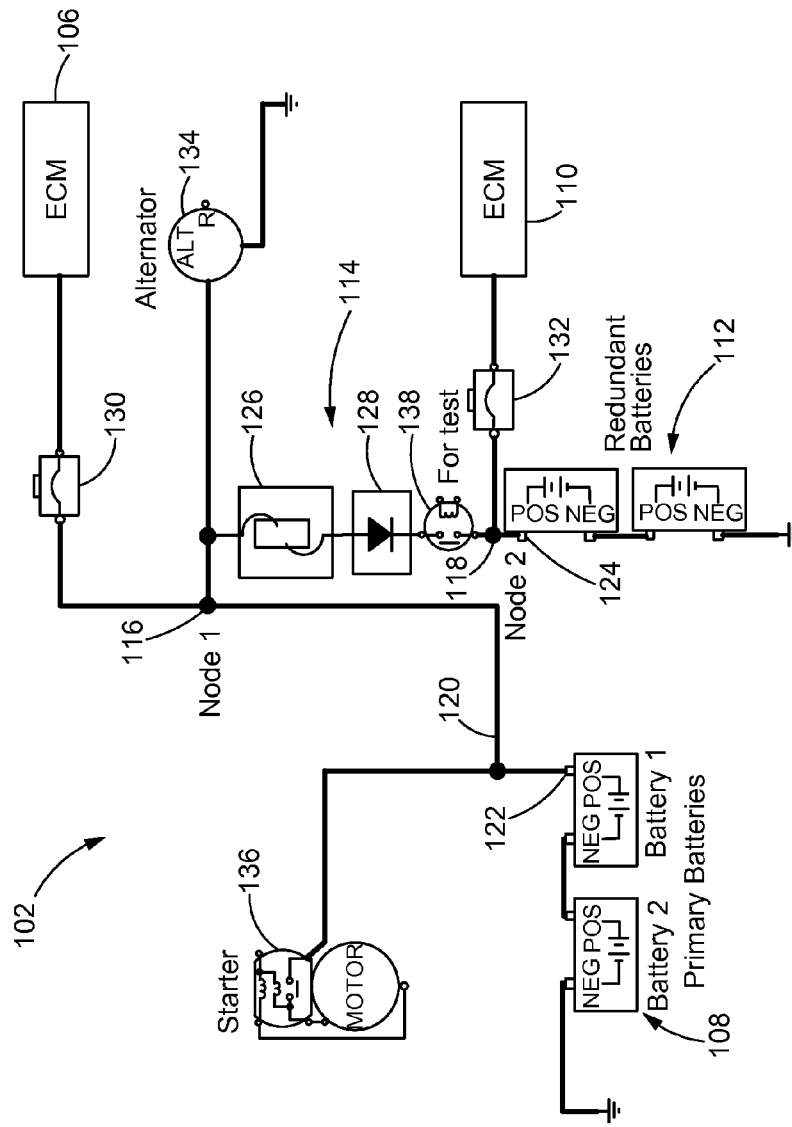
FIG. 2 is a schematic view of one exemplary embodiment of a redundant control system.

As shown in FIG. 1, the interface circuit 114 may be generally disposed in electrical communication between at least the first controller 106 and the second controller 110, and configured to appropriately isolate any short-circuit conditions which may occur along the lines interconnecting the power sources 108, 112 and the controllers 106, 110. As shown in FIG. 2, for example, the first controller 106 may be electrically coupled to the primary power source 108, depicted as series-connected batteries, through a first node 116, while the second controller 110 may be electrically coupled to the secondary power source 112, also shown as series-connected batteries, through a second node 118. More specifically, the first node 116 may be disposed anywhere along a common bus 120 extending between the first controller 106 and a positive terminal 122 of the primary power source 108, while the second node 118 may be disposed along any point between the second controller 110 and a positive terminal 124 of the secondary power source 112. Moreover, the interface circuit 114 may be electrically coupled in between the first node 116 and the second node 118 as shown.

Although other alternative embodiments are possible, the implementation of the interface circuit 114 of FIG. 2 may employ at least one fusible link 126 and at least one blocking device 128 disposed in series relative to one another and in between the first and second nodes 116, 118. The fusible link 126 may employ a fuse, a breaker, or any other known electrical device or component suitable for disconnecting, or opening, an electrical connection between the first node 116 and the second node 118 in the event of an over-current condition therethrough. The blocking device 128 may employ a fuse, a diode, a transistor, a switch, a breaker, or any other known electrical device or component suitable for restricting electrical current therethrough to flow from the second node 118 toward the first node 116. As shown, the control system 102 may further employ one or more protective elements 130, 132, for example, disposed between the first node 116 and the first controller 106, and between the second node 118 and the second controller 110. The protective elements 130, 132 may implement, for example, a breaker, a switch, a fuse, or any other suitable device adapted to automatically cause an open circuit and protect components of the control system 102 from short-circuit conditions, over-current conditions, or other electrical fault conditions. In further modifications, each of the protective elements 130, 132 may be configured with a current limit which approximates a current limit of the fusible link 126.

Among other things, the control system 102 of FIG. 2 may be coupled to an alternator 134 and a starter mechanism 136 associated with the machine 100. As commonly used in the art, the alternator 134 may serve to convert mechanical or rotational input sourced by a prime mover, such as an engine, of the machine 100 into DC voltage that may be supplied to any variety of loads connected to the common bus 120. Under normal operating conditions, for example, energy sourced by the alternator 134 and through the common bus 120 may be supplied to any of the first and second controllers 106, 110, thereby enabling proper control of at least steering system 104. Under particular fault conditions, or when the alternator 134 is unable to supply DC power to any one or more of the first and second controllers 106, 110, the primary and secondary power sources 108, 112 may be relied upon to supply the necessary DC voltage through the common bus 120 and to the appropriate controllers 106, 110. The starter mechanism 136 may include a starter motor, or any other suitable device for initially powering the machine 100, the control system 102 and the steering system 104, among others.

In addition, the interface circuit 114 of FIG. 2 may further include a self-test element 138, for example, electrically disposed between the first node 116 and the second node 118 as shown. The self-test element 138 may be used to ensure proper functionality of the redundant control system 102, and to pre-emptively test for or diagnose any fault conditions therein. More specifically, the self-test element 138 may enable the controllers 106, 110 to assess the state of each of the primary and secondary power sources 108, 112, and determine the ability of the power sources 108, 112 to properly function and backup the control system 102 in the event of a short-circuit or related fault condition. The self-test element 138 may employ one or more of a relay, a switch, or any other electrically controllable element that is selectively engageable between at least an opened state and a closed state. The self-test element 138 may be engaged manually, for example, in response to user input, and/or automatically, for example, upon every startup or in periodic cycles. The manner in which the self-test element 138 is engaged may be preprogrammed within one or more of the first and second controllers 106, 110, or any other control unit of the associated machine 100. In particular, the controllers 106, 110 may be configured to engage the self-test element 138 to electrically open upon machine startup or after engine start so as to isolate the power sources 108, 112, and determine if the voltages thereof meet the minimum required to appropriately support the controllers 106, 110, for instance, during a fault condition. Other features not discussed or disclosed in the drawings will be apparent to those skilled in the art without departing from the scope of the appended claims.

Figure 3:
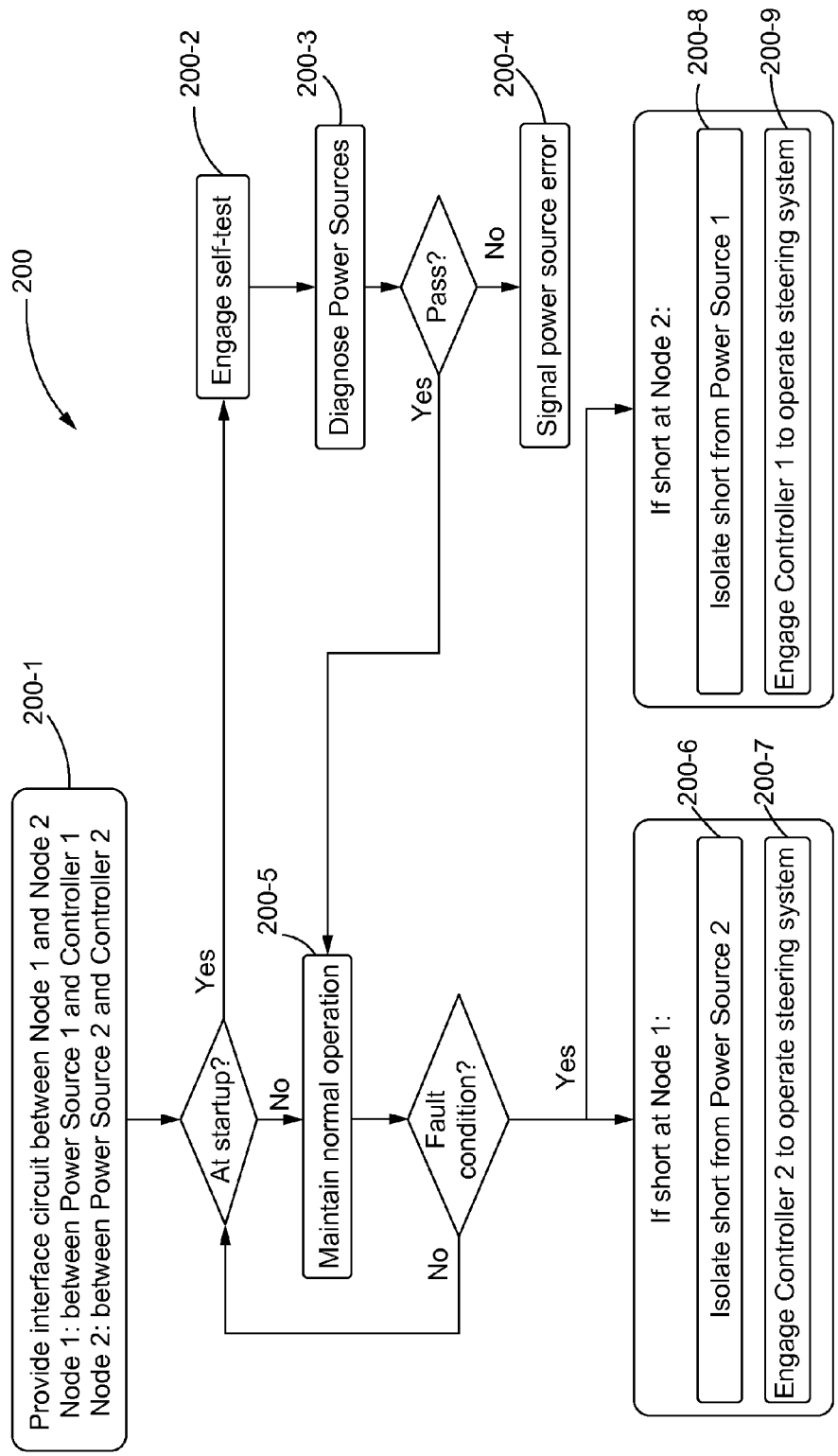
FIG. 3 is a diagrammatic view of one exemplary method of providing redundant control of a steering system.

Turning now to FIG. 3, one exemplary method 200 by which the control system 102 of FIG. 2 may operate is provided. In step 200-1, the method 200 may provide an interface circuit 114, as shown in FIG. 2 for example, that is electrically disposed between at least the first node 116 and the second node 118 of the control system 102, where the first node 116 is disposed between the first controller 106 and the primary power source 108 and the second node 118 is disposed between the second controller 110 and the secondary power source 112. Initially, the control system 102 may be configured to engage a self-test during step 200-2 if the machine 100 is determined to be at startup or after engine start. More specifically, once the machine 100 is started, one or more of the controllers 106, 110 or any other associated control unit may be configured to, for example, automatically engage the self-test element 138 of FIG. 2 to cause an open circuit thereacross. In so doing, the control system 102 may be able to substantially isolate and diagnose each of the primary and secondary power sources 108, 112 in step 200-3. If the DC voltage supplied across either of the power sources 108, 112 is detected to be less than the minimum bus voltage required to support the controllers 106, 108 during a fault condition, an error or appropriate warning may be triggered indicating the deficiency during step 200-4. If, however, the DC voltage supplied across both of the power sources 108, 112 meets or exceeds the minimum bus voltage, the control system 102 may proceed to maintain normal operating conditions in step 200-5. In other alternatives, the self-test may be automatically engaged based on other criteria, such as upon the expiration of a predefined time limit or based upon internal counters. In still further modifications, the self-test may also be engaged manually and in response to user input.

Figure 4:
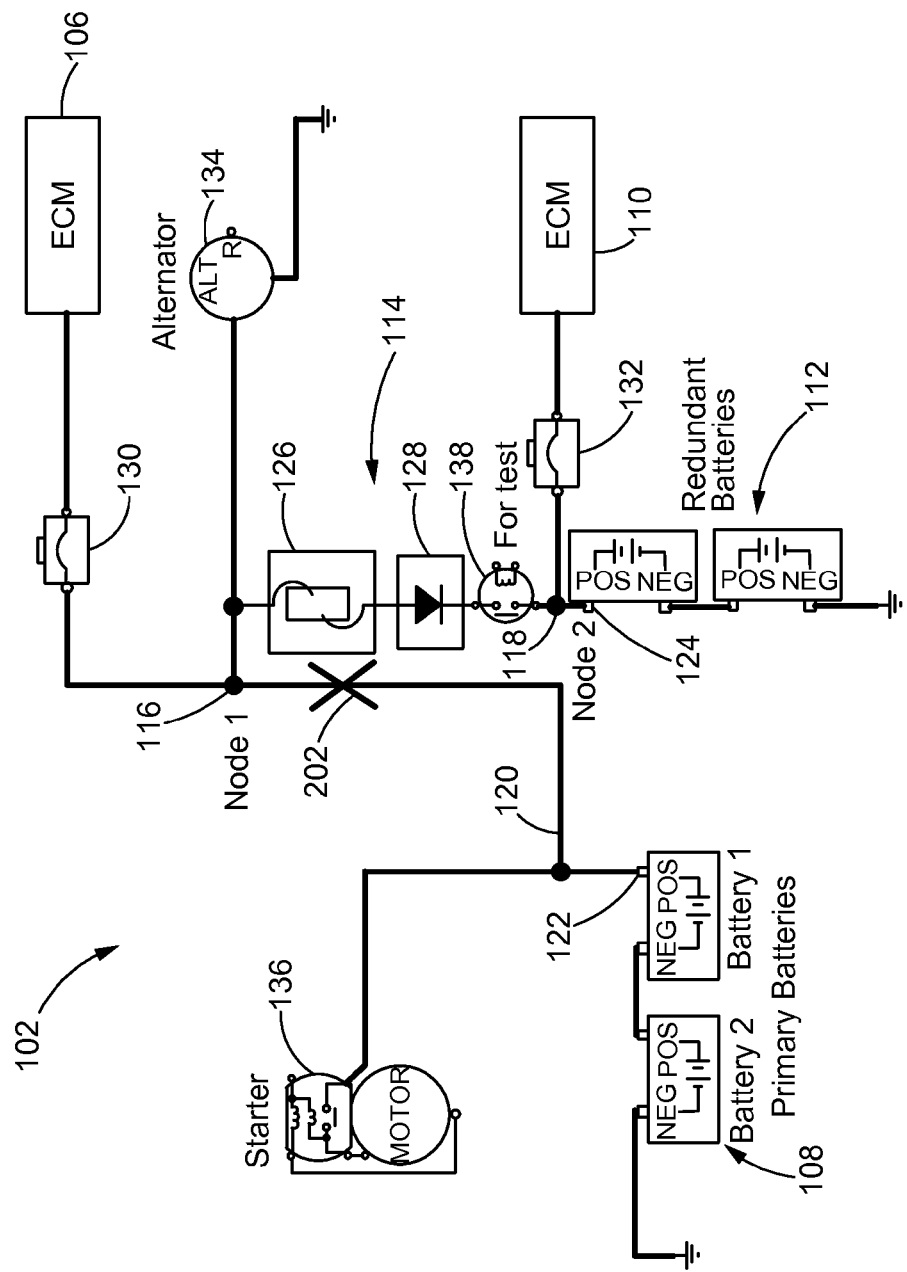
FIG. 4 is a schematic view of the redundant control system of FIG. 2 with a short-circuit at Node 1.

Still referring to FIG. 3, the control system 102 and interface circuit 114 may continue maintaining normal operating conditions in step 200-5 until a fault condition is determined. If a fault condition, such as a short-circuit to any of the primary or secondary power sources 108, 112, is detected, the control system 102 may proceed to either of steps 200-6 and 200-7 to respond accordingly. Specifically, if a short-circuit condition occurs in association with the first node 116, the interface circuit 114 may be configured to isolate the short-circuit from the second node 118, the second controller 110 and the secondary power source 112 in step 200-6. As illustrated in FIG. 4, for example, if there is a short-circuit 202 at the first node 116 between the positive terminal 122 of the primary power source 108 and ground, the voltage at the first node 116 as well as the voltage supplied to the first controller 106 may drop to zero. Although this creates a potential difference with the higher voltage output of the redundant or secondary power source 112, electrical current may be prevented from flowing from the secondary power source 112 and toward the first node 116 by the diode or blocking device 128, thereby isolating the short-circuit 202 from both the second controller 110 and the secondary power source 112. Furthermore, because the second controller 110, which is operatively independent from the first controller 106, is isolated from the short-circuit 202 and because the power supplied thereto by the secondary power source 112 remains substantially uninterrupted, the second controller 110 may be engaged in step 200-7 to maintain normal operation of the steering system 102.

Figure 5:
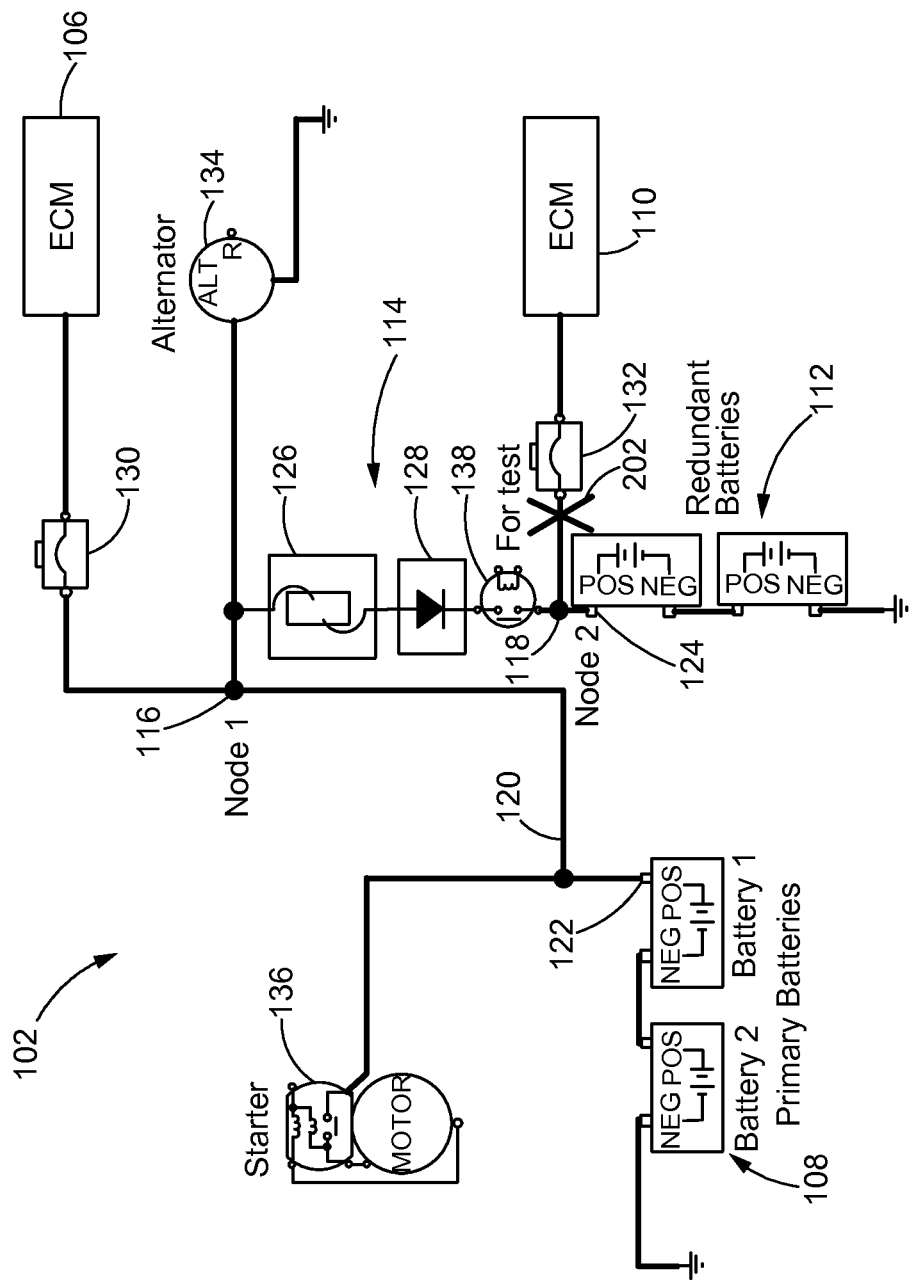
FIG. 5 is a schematic view of the redundant control system of FIG. 2 with a short-circuit at Node 2.

Conversely, if a short-circuit condition occurs in association with the second node 118, the interface circuit 114 may be configured to isolate the short-circuit from the first node 116, the first controller 106 and the first power source 108 in step 200-8. As illustrated in FIG. 5, for example, if there is a short-circuit 202 at the second node 118 between the positive terminal 124 of the secondary power source 112 and ground, the voltage at the second node 118 as well as the voltage to the second controller 110 may drop to zero. This short-circuit 202 may not only disable any operability of the second controller 110, but it may also create a potential difference with the first node 116 and the common bus 120. However, electrical current may be prevented from flowing from the common bus 120 and toward the second node 118 by the fusible link 126. For example, the fusible link 126 may serve as a fuse configured to disconnect, or create an open-circuit between the first and second nodes 116, 118, if the current flow therethrough exceeds a predetermined current limit. Moreover, the predetermined current limit may be selected based on current levels that are anticipated short-circuit conditions at the second node 118. Once an open-circuit is created by the fusible link 126, the short-circuit 202 may be isolated from the common bus 120, or more particularly, the first controller 106, the primary power source 108, the alternator 134. Furthermore, the power supplied to the first controller 106 by either the alternator 134 under normal operating conditions, or by the primary power source 108 under fault conditions, may remain substantially uninterrupted by the short-circuit 202 at the second node 118. Accordingly, the first controller 106 may be engaged in step 200-9 to maintain normal operation of the steering system 102.

INDUSTRIAL APPLICABILITY

In general, the foregoing disclosure finds utility in various applications relating to control systems for vehicles, machines, and the like. Specifically, the disclosed systems and methods may be used to provide less costly, effective and more reliable redundancy and safeguard mechanisms to steering systems controlling vehicles and machines, such as motor graders, wheel loaders, tractors, transport vehicles, and other machines commonly used in the industries of mining, construction, farming, transportation, and the like.

In particular, the present disclosure enables a steering system with redundancy that is not interrupted by short-circuit conditions at the battery terminals, but rather, at least temporarily, enables continued operator control in vehicles or machines employing electro-hydraulic or steer-by-wire steering systems. Moreover, in conjunction with warnings or other notifications with regards to the short-circuit condition, the present disclosure may enable the operator to manipulate or further steer the vehicle or machine into more convenient positions or locations until appropriate repairs can be made.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of providing redundant control of a steering system using one of a first controller and a second controller, the method comprising the steps of:
    providing an interface circuit between at least a first node and a second node of the steering system, the first node being electrically disposed between a primary power source and the first controller, the second node being electrically disposed between a secondary power source and the second controller;
    automatically engaging a self-test of the primary power source and the secondary power source upon machine startup;
    in response to a short at the first node, engaging the interface circuit to isolate the short from the secondary power source, and engage the second controller to operate the steering system; and
    in response to a short at the second node, engaging the interface circuit to isolate the short from the primary power source, and enable the first controller to operate the steering system.

2. The method of claim 1, wherein the interface circuit includes one or more self-test elements that are electronically actuatable for engaging the self-test.

3. The method of claim 2, wherein the self-test element includes one or more of a relay and a switch that is electronically engageable between an opened state and a closed state, the self-test element being automatically engaged into the opened state upon machine startup.

4. The method of claim 1, wherein the interface circuit includes at least a fusible link configured to prevent dissipation of current from the primary power source through a short at the second node, and enable the first controller to maintain operation of the steering system.

5. The method of claim 1, wherein the interface circuit includes at least a blocking device configured to prevent dissipation of current from the secondary power source through a short at the first node, and enable the second controller to operate the steering system.

6. A redundancy system for a steering system having a primary controller and a primary power source, the redundancy system comprising:
    a secondary controller coupled to a secondary power source and configured to manage control of the steering system; and
    an interface circuit disposed between at least a first node and a second node, the first node being in electrical communication with the primary power source, the second node being in electrical communication with the secondary power source, the interface circuit being configured to selectively engage a self-test of the primary power source and the secondary power source, isolate a short at the first node from the secondary power source, and isolate a short at the second node from the primary power source.

7. The redundancy system of claim 6, wherein the self-test element employs one or more of a relay and a switch, and is electronically engageable between an opened state and a closed state.

8. The redundancy system of claim 6, wherein the self-test element is automatically engaged into an opened state upon machine startup to diagnose any deficiencies in the primary power source and the secondary power source.

9. The redundancy system of claim 6, wherein each of the primary power source and the secondary power source comprises one or more batteries capable of supplying a direct current (DC) to a common bus extending between the first node and the second node.

10. The redundancy system of claim 6, wherein the interface circuit includes at least a fusible link employing one or more of a fuse and a breaker configured to prevent dissipation of current from the primary power source through a short at the second node.

11. The redundancy system of claim 6, wherein the interface circuit includes at least a blocking device employing one or more of a fuse, a diode, a transistor, a switch, and a breaker configured to prevent dissipation of current from the secondary power source through a short at the first node.

12. The redundancy system of claim 6, wherein a first protective element is disposed between the primary power source and the primary controller, a second protective element is disposed between the secondary power source and the secondary controller, each of the first protective element and the second protective element having a current limit approximate to that of a fusible link of the interface circuit disposed between the first node and the second node.

13. A control system, comprising:
    a primary power source in communication with a common bus associated with the control system;
    a secondary power source in selective communication with the common bus;
    a first controller in communication with a first node of the common bus configured to manage control of a steering system;
    a second controller in communication with a second node of the common bus configured to manage control of the steering system; and
    an interface circuit disposed between the first node and the second node, the interface circuit having a blocking device configured to isolate a short at the first node from the secondary power source, a fusible link configured to isolate a short at the second node from the primary power source, and a self-test element configured to selectively engage a self-test of the primary power source and the secondary power source.

14. The control system of claim 13, wherein the self-test element employs one or more of a relay and a switch, and is electronically engageable between an opened state and a closed state.

15. The control system of claim 13, wherein the self-test element is automatically engaged into an opened state upon machine startup to diagnose any deficiencies in the primary power source and the secondary power source.

16. The control system of claim 13, wherein each of the primary power source and the secondary power source comprises one or more batteries supplying a direct current (DC) to the common bus, the first node being in communication with a positive terminal of the batteries of the primary power source, and the second node being in communication with a positive terminal of the batteries of the secondary power source.

17. The control system of claim 13, wherein the fusible link employs one or more of a fuse and a breaker and is configured to prevent dissipation of current from the primary power source through a short at the second node.

18. The control system of claim 13, wherein the blocking device employs one or more of a fuse, a diode, a transistor, a switch, and a breaker and is configured to prevent dissipation of current from the secondary power source through a short at the first node.

19. The control system of claim 13, wherein a first protective element is disposed between the primary power source and the first controller, a second protective element is disposed between the secondary power source and the second controller, each of the first protective element and the second protective element having a current limit approximate to that of the fusible link.

20. The control system of claim 13, wherein the common bus is in electrical communication with an alternator configured to supply a bus voltage during normal operating conditions.

* * * * *